United States Patent [19]

Durhman

[11] Patent Number: 4,943,180
[45] Date of Patent: Jul. 24, 1990

[54] INTERLOCKING CORNER PLUG SYSTEM

[75] Inventor: Paul P. Durhman, Winnebago, Minn.

[73] Assignee: Advanced Fiber Products, Winnebago, Minn.

[21] Appl. No.: 278,557

[22] Filed: Dec. 1, 1988

[51] Int. Cl.⁵ .............................................. F16B 7/00
[52] U.S. Cl. .................................... 403/295; 403/401; 403/382
[58] Field of Search ............... 403/401, 403, 266, 268, 403/265, 295, 292, 402, 231, 382

[56] References Cited

U.S. PATENT DOCUMENTS

| | | | |
|---|---|---|---|
| 3,782,054 | 1/1974 | Goss, Jr. | 403/401 X |
| 3,973,854 | 8/1976 | Gilbo et al. | 403/231 X |
| 4,250,680 | 2/1981 | Bomar | 403/401 X |
| 4,452,138 | 6/1984 | Bubley et al. | 403/402 X |

FOREIGN PATENT DOCUMENTS 727246 10/1942 Fed. Rep. of Germany ...... 403/231

Primary Examiner—Randolph A. Reese
Assistant Examiner—J. Russell McBee
Attorney, Agent, or Firm—Palmatier & Sjoquist

[57] ABSTRACT

Apparatus and method for connecting a pair of end-to-end abutting tubular structural members which are commonly used in the construction of handrails and the like, which includes a pair of interengageable inserts, and each of which is disposed within one of the tubular members and designed to interengage with the other insert at a point adjacent to where the pair of tubular members meet. Each connector insert includes a plurality of free-end leg portions which interengage in an alternate overlapping relation with the leg portions of the other insert so as to provide a strong support at the joint between the abutting ends of the tubular members. The overlapping surfaces of the interengageable inserts may be further bonded together so as to prevent the same from becoming separated, and each tubular member may also be bonded at least to the respective insert into which it is inserted, thereby securely adhering the respective tubular members in a closely abutting relationship. This completed joint has no external indication of the internal joint, other than the strength of the connection.

22 Claims, 1 Drawing Sheet

INTERLOCKING CORNER PLUG SYSTEM

BACKGROUND OF THE INVENTION

1. Field of the Invention - The present invention pertains to structural members, and more particularly, pertains to construction of pultruded Fiberglass ® structural members, such as in handrails.

2. Description of the Prior Art - In the past prior art, elongated tubular structural members, whether made of Fiberglass ® or some other rigid materials, have commonly been used in the construction of handrails and the like. Such handrails are generally formed of a plurality of elongated tubular structural members, having a variety of cross-sectional configurations (such as circular or square shaped or mitered corners), which are connected in an end-to-end abutting relationship. Such tubular structural members may be connected in a straight line or may form corners of 0° to 90° depending upon the specific need for the situation involved.

One of the more prominent problems involved in the construction of these handrails is the need to provide a strong joint between adjacent tubular members so as to resist separation thereof due to excessive transverse or longitudinal forces applied at the miter joint.

In the past prior art, such methods as inserting and securing a secondary piece of material within the tubular handrails in a position crossing the joint between adjacent colinear tubular members have been utilized to strengthen the joint therebetween. It is conceivable that a single insert could be used as such at the corner joints between adjacent tubular members, but such an insert would clearly not provide the necessary support to the joint, since only a small portion of the end of the insert would be exposed for the connecting tubular member to rest on and be secured to.

Other methods have also been used to secure corner joints, such as providing end caps which fit over one tubular member and have a rod extending angularly away therefrom which is capable of being inserted into an adjacent connecting tubular member. With this type of construction, one portion of the end cap functions as an insert and another portion acts as a sleeve, which protrudes outwardly from the tubular structural members and necessarily creates a non-uniform appearance which is not aesthetically pleasing to the eye.

There is a great need for a structure for rigidly supporting corner joints between adjacent tubular handrail members so as to prevent damage from excessive transverse and longitudinal forces thereon. Such a support structure must provide equal support to both adjoining tubular members, both transversely and longitudinally, and must provide a uniform look which is aesthetically pleasing to the eye.

The present invention, as described and shown herein, provides such support and is designed to be completely enclosed within the tubular members so as to provide a uniform appearance thereto, and overcome the disadvantages of the prior art.

SUMMARY OF THE INVENTION

The present invention is generally related to the construction system for handrails and other similar structures or framed corners or any miter corners. More specifically, the general purpose of the present invention relates to providing strengthened cornered joints for such handrails and other structures, whereby abutting connecting ends of such handrails or other structures may be securely connected together with the assurance that the joints of the abutting ends of adjacent structural members will not be separated due to forces exerted thereon in the longitudinal or transverse direction.

The present invention generally includes a pair of inserts which are designed to be compliantly positioned and slidably inserted into the abutting ends of a pair of tubular structural members, which are commonly used in the construction of handrails and the like. As used herein, and throughout this specification, the term "tubular" refers to any hollow structural member, which may have a variety of cross-sectional configurations, including, but not limited to, square, rectangular, circular, oval, or any other geometrical configuration.

Each insert is designed to be positioned within separate abutting tubular members at a point adjacent their abutting ends. Generally, each insert is comprised of a plurality of substantially parallel spaced leg portions which extend outwardly from and are cantilevered from a leg support member which lies in a plane substantially normal to the leg portions.

The leg portions of each insert, when inserted into its respective tubular member, extends in a direction generally towards the other insert which is positioned within the other tubular member, and the leg portions of each insert are designed to cooperatively interengage with the legs of the other insert as each tubular member containing its insert is abutted against the other tubular member, to form a corner thereby. By so doing, the endmost portion of the insert legs of each insert overlap in an alternating manner with the leg portions of the other insert, thereby forming an internal corner support which has a combined transverse thickness in a direction normal to the plane of such leg portions which is approximately equal to the same relative transverse inner dimension of each tubular member. Thus, the interengaging of the inserts provides an effective strong support at the corner joint between the two tubular members.

Each insert is designed to be adhesively secured to the other insert at the interengaging portions thereof, and each insert is also preferably adhesively secured to portions of the internal surface of each tubular member. By adhesively securing the inserts to each other and to the inner surfaces of each tubular member, the resulting structure becomes a substantially solid and rigid corner support which can withstand substantial transverse and longitudinal forces without separation thereof.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

Figure 1:
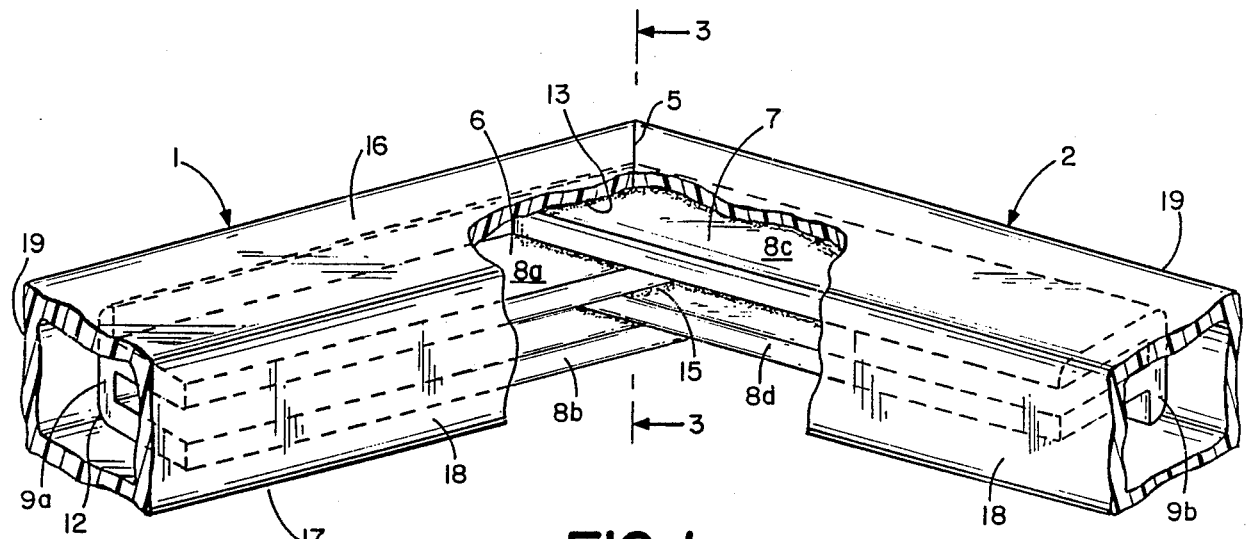
FIG. 1 illustrates a perspective view of the present invention in its assembled state having a portion thereof broken away so as to show the interengaging inserts which provide transverse and longitudinal support to the encompassing tubular members which comprise a handrail or any other like structure.
Figure 3:
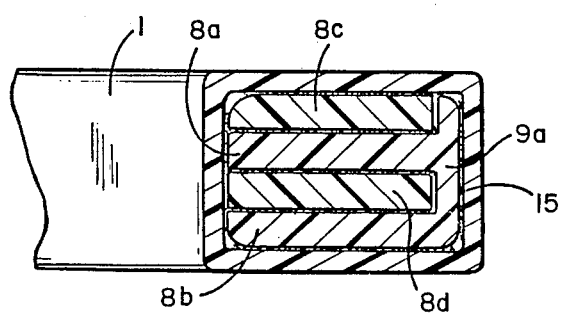
Figure 4:
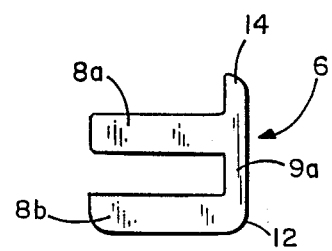

1, showing how the individual pieces of my invention cooperatively fit together to form a rigid support for the corners of handrails;

FIG. 3 illustrates a sectional view taken along line 3-3 of FIG. 1, showing the solid mass formed by the interlocking inserts near the joint of adjacent tubular members, and showing an adhesive which secures the inserts together and to the tubular member; and, FIG. 4 illustrates an end view of one of the substantially identically configured inserts, showing the spaced leg portions being cantilevered from the back leg support member.

DESCRIPTION OF THE PREFERRED EMBODIMENTS

FIG. 1 illustrates a corner portion of a handrail including the present invention in its assembled state wherein a pair of tubular members 1 and 2 are angularly disposed relative to each other with mitered abutting end portions 3 and 4, respectively, which are compliantly connected together so as to form a uniform and aesthetically pleasing corner joint 5. Disposed within tubular members 1 and 2 are a pair of inserts 6 and 7 which function as a supporting structure for the corner formed by tubular members 1 and 2.

More specifically, the supporting structure of the present invention, includes elongated inserts 6 and 7, which are respectively disposed within tubular members 1 and 2 in an area adjacent to the abutting ends thereof. Inserts 6 and 7 are substantially similar in cross-sectional configuration, and are oppositely disposed in inverted relation within each respective tubular member. As shown in FIG. 1, each insert 6 and 7 is designed to cooperatively interengage in an alternating overlapping manner so as to substantially fill the internal volume of the abutting tubular members in an area immediately adjacent corner joint 5 of the same. In so doing, inserts 6 and 7 form a very strong and rigid solid mass within tubular members 1 and 2 at the corner joint 5 between the abutting ends thereof.

Figure 2:
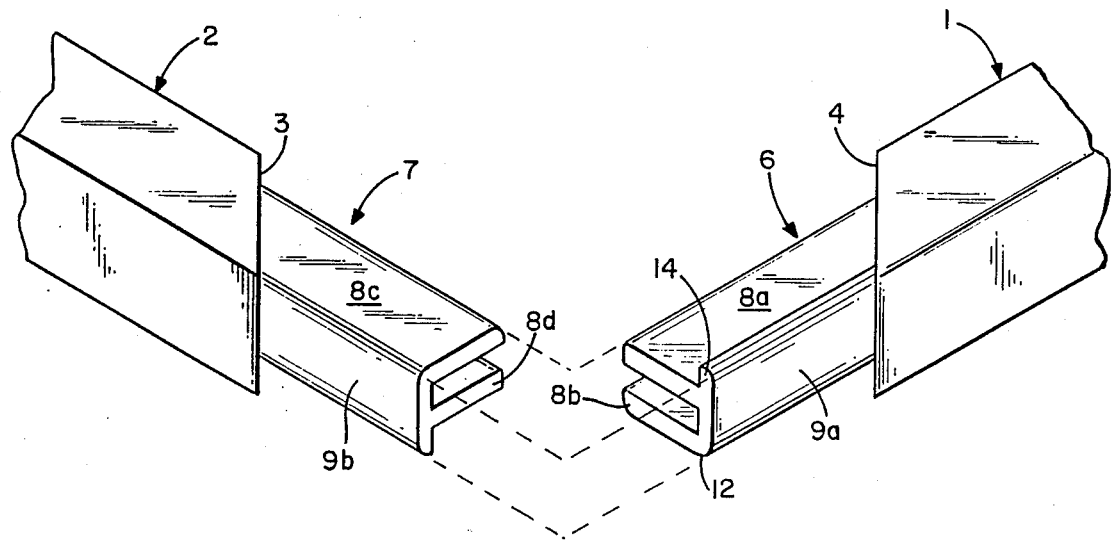
FIG. 2 illustrates an exploded view of the present invention from the reverse angle of that shown in FIG.

FIG. 2 illustrates each insert 6 and 7 disposed within their respective tubular members 1 and 2 in opposite facing inverted relation to each other. As can be seen from the drawings, each insert 6 has spaced free-end leg portions 8a and 8b which extend outwardly from and are cantilevered from a leg support member 9a. Similarly, insert 7 has spaced free-end leg portions 8c and 8d which extend outwardly from and are cantilevered from a leg support member 9b. Each insert is preferably constructed of a readily bondable moldable material, such as Fiberglass, and preferably leg portions 8a-8d form an integral part of their respective leg support member 9a and 9b.

FIG. 4 illustrates each insert 6 and 7 as substantially similar in cross-sectional configuration throughout their entire length.

It should be noted that although the preferred embodiment shown in the drawings illustrates the inserts as having two outwardly extending leg portions, the scope of the invention is not necessarily limited thereto. It is within the teachings of the present invention to have a single or a plurality of leg portions on each insert which are designed to interengage in a similar manner as those shown in FIG. 1.

MODE OF OPERATION

The assembled handrail system as illustrated in FIG. 1, which is comprised of tubular members 1 and 2, has a rectangular cross-sectional configuration which is defined by top face 16, bottom face 17, and inner and outer sidewalls 18 and 19, respectively, which extend between the top face 16 and bottom face 17 of the handrail. The dimensions of each insert 6 and 7 are such to cooperatively engage the central opening of their respective tubular members and 2. The tightness of the fit and tolerances of the members allow proper fitness of adhesive application.

As shown in FIG. 1, in its assembled state, it can be seen that leg portion 8a of insert 6 extends between the spaced leg portions 8c and 8d of insert 7. Similarly, leg portion 8d of insert 7 extends between the spaced leg portions 8a and 8b of insert 6. Each leg portion of each insert overlaps an adjacent leg portion of the opposing insert in alternating relation.

For instance, each of the leg support members 9a and 9b of inserts 6 and 7, respectively, lay adjacent to and parallel with the inner face of outer sidewall 19 when inserted within their respective tubular members. Each leg support member has a width dimension which is only slightly less than the corresponding inner dimension of sidewall 19 against which it lies, to facilitate easy slideable engagement within the tubular member. Moreover, each insert 6 and 7 also has one of its leg portions cantilevered from one edge of its respective leg support member, which extends outwardly therefrom a distance only slightly less than the corresponding inner dimensions of the top and/or bottom faces of its respective tubular member.

More specifically, in regards to insert 6, leg support member 9a has a width dimension which is only slightly less than the inner dimension of sidewall 19 of its respective tubular member 1. Leg portion 8b, which is cantilevered from edge portion 1 of leg support member 9a extends outwardly a distance which is only slightly less than the inner dimensions of bottom face 17 of tubular member 1. Both leg support member 9a and leg portion 8b cantilevered therefrom have outer faces which lie closely adjacent to and conform to the respective inner faces of sidewall 19 and bottom face 17, respectively, of tubular member 1. As clearly shown in FIG. 4, the other leg portion 8a of insert 6 is cantilevered from its leg support member 9a at a point intermediate edge 12 and 14 thereof, and is spaced from leg portion 8b.

Since insert 7 is configured substantially identical to insert 6, the above discussion relative to the construction of insert 6 is equally applicable to insert 7. The difference between insert 6 and insert 7 is the relative positioning within their respective tubular members. Insert 7 is disposed within tubular member 2 in the inverted relation to the positioning of insert 6 within the tubular member 1. Leg portion 8c of insert 7 lies adjacent to and conforms to the inner surface of the top face 16 of its respective tubular member 2.

Prior to placing insert 6 and 7 in an interengaging relationship, an adhesive 15 is preferably, but not necessarily limited thereto, applied to the interengaging surfaces of each respective leg portion of each insert. In so doing, each insert is securely connected to the other, thereby providing a rigid mass of interlocked leg portions which provides substantial support against transverse forces in the area near joint 5 between adjacent abutting tubular members 1 and 2. The adhesive may be applied over the interengaging surfaces in a substantially continuous manner or may be spot-glued as appropriate.

Each insert may also be adhesively connected to each tubular member in a manner as described hereinbelow. As can be seen in the drawings and as indicated above, each insert has a leg support member and at least one leg portion which has its outer face lying in a plane substantially parallel to and conforming with the inner surface of one of the walls of its respective tubular members. This facilitates adherence of the inserts to the tubular members so as to provide substantial systematic support against longitudinal forces which may act to separate the abutting tubular members at stress joint 5.

As shown in FIGS. 1 and 3, the outer face of leg portion 8c is adhesively secured to the inner surface of the top face 16 of its respective tubular member 2, and is also adhesively secured to a portion of tubular member 1, designated as point 13, adjacent its abutting end. Similarly, the outer face of leg portion 8b of insert 6 is adhesively secured to the inner surface of the bottom face 17 of its respective tubular member 1, and is also adhesively secured to the abutting end portion of tubular member 2. Each outside face of each leg support member 9a and 9b is also adhesively secured to its respective tubular member along the corresponding adjacent inner face of sidewall 19 in a manner substantially similar to that described above.

By securing each insert to each respective tubular member, each tubular member is effectively secured to the interlocked inserts, so that the tubular members 1 and 2 are effectively connected in abutting relationship so as to thereby form a corner. Moreover, by adhesively securing tubular members 1 and 2 to the interlocked inserts, such as with an epoxy or like fiberglass bonding chemical, a strong support is provided for protection against separation at the joint 5 from longitudinal forces which may be applied thereto. With the entire system adhesively interlocked together, the resulting structure forms a rigid corner joint which provides an effective support against transverse or longitudinal forces which have caused separation along joint 5 of abutting corner tubular members in the past. Additional securing structure, such as nut and bolt assemblies or self-tapping screws or pinning can be utilized to further secure the members of the system.

FIG. 3 illustrates the resulting mass of adhesively interlocked leg portions, which is disposed immediately below joint 5 of a pair of abutting tubular members 1 and 2, which is substantially throughout the inner core of the tubular members near joint 5. As such, any transverse forces upon one or both of the tubular members would only cause the overlapping adhesively secured leg portions to bind through shear strength of the bond against each other, thereby preventing any separation at joint 5. Also clearly shown in FIG. 3 is the application of the adhesive which securely bonds inserts 6 and 7 together, and tubular members 1 and 2 to the inserts.

The shape is unidirectional and when cut in half, the one part or half turned end-to-end, rotated 180°, inserts into itself without any additional cutting by machine.

In considering the present invention, the drawings and disclosure made herein are illustrative only and the scope of the present invention should be determined from the appended claims in view of the specification.

Various modifications can be made to the present invention without departing from the apparent scope hereof.

I claim:

1. A structure for connecting a pair of adjacent end-to-end abutting tubular structural members, comprising:

a. a pair of elongated tubular members having abutting ends, each of said tubular members being disposed at an angle relative to the other of said tubular members;
   b. a pair of elongated interengaging supporting connector inserts, each of which is constructed and arranged to be positioned within said abutting end of one of said tubular members, and to interengage with said other insert at a point adjacent said abutting ends of said tubular members, said inserts being generally U-shaped cross-sectionally and comprised of a pair of spaced confronting free-end leg portions cantilevered from and extending outwardly from a leg support member;
   c. means for securing said inserts together in interengaging relation; and,
   d. means for securing said tubular members together.

2. The structure defined in claim 1, wherein said inserts are constructed and arranged to interengage in such a manner that a portion of one of said leg portions of each of said inserts is disposed between said spaced confronting leg portions of the other of said inserts.

3. The structure defined in claim 2, wherein each of said inserts is configured cross-sectionally substantially identical to said other insert, said inserts interengaging whereby one of said inserts is invertedly disposed in relation to the other of said inserts.

4. The structure defined in claim 2, wherein said leg support member of each of said inserts is disposed in a plane substantially normal to said leg portions cantilevered therefrom, and extends beyond the outer confines of one of said leg portions a distance approximating the thickness of one of said leg portions of the other of said inserts.

5. The structure defined in claim 1, wherein each of said inserts is comprised of a plurality of spaced free-end leg portions extending outwardly from and being cantilevered from a leg support member in a plane substantially normal thereto.

6. The structure defined in claim 5, wherein some of said leg portions of each of said inserts are disposed between said spaced leg portions of the other of said inserts so as to form a plurality of alternating overlapping leg portions in the area where said inserts are in direct interengaging relation.

7. The structure defined in claim 5, wherein said leg portions of each of said inserts interengage with said leg portions of the other of said inserts in alternating overlapping relation.

8. The structure defined in claim 7, wherein said leg portions of each of said inserts overlap some of said leg portions of the other of said inserts to a point where each of said leg portions of each of said inserts lies closely adjacent to said leg support member of the other of said inserts.

9. The structure defined in claim 1, wherein the interengaging portions of said inserts are bonded together, and each of said tubular members is bonded to at least said insert which is received therein.

10. The structure defined in claim 5, wherein at least some of said leg portions of each of said inserts are bonded to some of said leg portions of the other of said inserts, and the inside surface of each of said tubular members is bonded to at least one of said inserts.

11. The structure defined in claim 1, wherein said tubular members are secured together in interlocking relation.

12. The structure defined in claim 5, wherein at least said leg support member and one of said free-end leg portions of each of said inserts are bonded to the inside surface of said tubular member in which it is disposed.

13. A system for connecting and supporting adjacent end-to-end abutting tubular members, comprising:
   a. a pair of elongated tubular members being constructed and arranged to have abutting ends and each of said tubular members having an axial opening therethrough, and one of said tubular members being disposed at an angle relative to the other of said tubular members;
   b. a pair of elongated interengaging inserts, each of said inserts being disposed within said opening adjacent said abutting end of one of said tubular members, said inserts having a plurality of spaced free end leg portions and being constructed and arranged to interengage in supporting and connecting relation to said abutting tubular members, said inserts being generally U-shaped cross-sectionally and being comprised of a pair of spaced confronting free-end leg portions cantilevered from and extending outwardly from a leg support member; and,
   c. means for securing said abutting tubular members and said interengaging inserts in interlocked relation.

14. The system defined in claim 13, wherein each of said inserts is comprised of a plurality of spaced free-end leg portions extending outwardly from and being cantilevered from a leg support member in a plane substantially normal thereto.

15. The system defined in claim 14, wherein some of said leg portions of each of said inserts are disposed between said spaced leg portions of the other of said inserts so as to form a plurality of alternating overlapping leg portions in the area where said inserts are in direct interengaging relation.

16. The system defined in claim 14, wherein at least some of said leg portions of each of said inserts are bonded to some of said leg portions of the other of said inserts, and the inside surface of each of said tubular members is bonded to at least one of said inserts.

17. A method of connecting and providing support for a pair of adjacent end-to-end abutting tubular structural members, comprising the steps of:
   a. providing a pair of elongated inserts having interengagable portions, said inserts being generally U-shaped cross-sectionally and being comprised of a pair of spaced confronting free-end leg portions cantilevered from and extending outwardly from a leg support member;
   b. applying bonding means to at least said interengagable portions of said inserts, and to the inner surface of each of said tubular members adjacent its abutting end; and,
   c. positioning each of said inserts within opposite ends of said tubular members in interengaging relation with each other and adjacent said tubular member's abutting ends so as to connect and support the abutting ends of said tubular members.

18. The method of claim 17 comprising the step of using an epoxy adhesive for said bonding means.

19. The method of claim 17 comprising the step of adding securing means in addition to said bonding means.

20. A structure for connecting a pair of adjacent end-to-end abutting tubular structural members, comprising:
   a. a pair of elongated tubular members having abutting ends, each of said tubular members being disposed at an angle relative to the other of said tubular members;
   b. a pair of elongated interengaging supporting connector inserts, each of which is constructed and arranged to be positioned within said abutting end of one of said tubular members, and to interengage with said other insert at a point adjacent said abutting ends of said tubular members, each of said inserts being comprised of a plurality of spaced free-end leg portions extending outwardly from and being cantilevered from a leg support member in a plane substantially normal thereto, at least said leg support member and one of said free-end leg portions of each of said inserts being bonded to the inside surface of said tubular member in which it is disposed;
   c. means for securing said inserts together in interengaging relation; and,
   d. means for securing said tubular members together.

21. A structure for connecting a pair of adjacent end-to-end abutting tubular structural members, comprising:
   a. a pair of elongated tubular members having abutting ends, each of said tubular members being disposed at an angle relative to the other of said tubular members;
   b. a pair of elongated interengaging supporting connector inserts, each of which is constructed and arranged to be positioned within said abutting end of one of said tubular members, and to interengage with said other insert at a point adjacent said abutting ends of said tubular members, each of said inserts being configured cross-sectionally substantially identical to said other insert, said inserts interengaging whereby one of said inserts is invertedly disposed in relation to said other insert;
   c. means for securing said inserts together in interengaging relation; and,
   d. means for securing said tubular members together.

22. A multi-sided frame having a corner, comprising:
   a. a pair of elongate glass fiber-like frame elements extending transversely of each other and extending toward such a corner;
   b. each of the elongate from elements having an interleaving flange portion and a confining flange portion, said flange portions confronting each other in spaced relation and defining a receiving groove there between, and each of the frame elements also having a backing portion formed integrally with said flange portions, the receiving groove and interleaving flange portion of each of the frame elements having substantially equal thicknesses and being assembled with the flange portion and groove of the other frame element at the corner, and
   c. each of the elongate frame elements being substantially identical so that the elements may be interengaged by inverting one of the elements whereby the elements may be formed from one glass fiber-like piece having a cross-section substantially identical to the elements.

* * * * *

UNITED STATES PATENT AND TRADEMARK OFFICE
CERTIFICATE OF CORRECTION

PATENT NO. : 4,943,180

DATED : July 24, 1990

INVENTOR(S) : Paul P. Durhman

It is certified that error appears in the above-identified patent and that said Letters Patent is hereby corrected as shown below:

Column 4, line 7, after "members", insert --1--.

Column 8, line 49, delete "from", and substitute --frame--.

Signed and Sealed this

Fifth Day of May, 1992

Attest:

DOUGLAS B. COMER

Attesting Officer   Acting Commissioner of Patents and Trademarks